United States Patent
Sivasubramanian et al.

(10) Patent No.: US 8,458,250 B2
(45) Date of Patent: *Jun. 4, 2013

(54) REQUEST ROUTING USING NETWORK COMPUTING COMPONENTS

(75) Inventors: Swaminathan Sivasubramanian, Seattle, WA (US); David R. Richardson, Seattle, WA (US); Christopher L. Scofield, Seattle, WA (US); Bradley E. Marshall, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,005

(22) Filed: Aug. 6, 2012

(65) Prior Publication Data

US 2012/0303785 A1    Nov. 29, 2012

Related U.S. Application Data

(60) Continuation of application No. 13/042,301, filed on Mar. 7, 2011, now Pat. No. 8,239,571, which is a division of application No. 12/165,343, filed on Jun. 30, 2008, now Pat. No. 7,925,782.

(51) Int. Cl.
    *G06F 15/16*    (2006.01)
(52) U.S. Cl.
    USPC ........... 709/203; 709/217; 709/227; 709/230; 709/238; 709/245
(58) Field of Classification Search
    USPC ................. 709/203, 217, 226, 238, 249, 250, 709/245
    See application file for complete search history.

(56) References Cited

U.S. PATENT DOCUMENTS

| 5,341,477 A | 8/1994 | Pitkin et al. |
| 5,611,049 A | 3/1997 | Pitts |

(Continued)

FOREIGN PATENT DOCUMENTS

| CN | 1422468 A | 6/2003 |
| WO | WO 2007/007960 A1 | 1/2007 |
| WO | WO 2012/044587 A1 | 4/2012 |

OTHER PUBLICATIONS

American Bar Association; Digital Signature Guidelines Tutorial [online]; Feb. 10, 2002 [retrieved on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.

(Continued)

*Primary Examiner* — Michael Y Won
(74) *Attorney, Agent, or Firm* — Knobbe Martens Olson & Bear, LLP

(57) ABSTRACT

A system, method and computer-readable medium for request routing. A DNS server at a content delivery network service provider obtains a DNS query corresponding to a resource requested from a client computing device and associated with a first resource identifier. The first resource identifier includes a first portion with DNS information and a second portion with path information. The DNS server selects a network computing component for processing the requested resource based on the DNS portion of the resource identifier and transmits information identifying the selected network computing component to the client computing device.

25 Claims, 11 Drawing Sheets

U.S. PATENT DOCUMENTS

| | | |
|---|---|---|
| 5,774,660 A | 6/1998 | Brendel et al. |
| 5,892,914 A | 4/1999 | Pitts |
| 6,016,512 A | 1/2000 | Huitema |
| 6,026,452 A | 2/2000 | Pitts |
| 6,052,718 A | 4/2000 | Gifford |
| 6,085,234 A | 7/2000 | Pitts et al. |
| 6,098,096 A | 8/2000 | Tsirigotis et al. |
| 6,108,703 A | 8/2000 | Leighton et al. |
| 6,182,111 B1 | 1/2001 | Inohara et al. |
| 6,185,598 B1 | 2/2001 | Farber et al. |
| 6,192,051 B1 | 2/2001 | Lipman et al. |
| 6,205,475 B1 | 3/2001 | Pitts |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,415,280 B1 | 7/2002 | Farber et al. |
| 6,457,047 B1 | 9/2002 | Chandra et al. |
| 6,484,143 B1 | 11/2002 | Swildens et al. |
| 6,505,241 B2 | 1/2003 | Pitts |
| 6,553,413 B1 | 4/2003 | Leighton et al. |
| 6,560,610 B1 | 5/2003 | Eatherton et al. |
| 6,611,873 B1 | 8/2003 | Kanehara |
| 6,654,807 B2 | 11/2003 | Farber et al. |
| 6,658,462 B1 | 12/2003 | Dutta |
| 6,678,791 B1 | 1/2004 | Jacobs et al. |
| 6,694,358 B1 | 2/2004 | Swildens et al. |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,785,704 B1 | 8/2004 | McCanne |
| 6,804,706 B2 | 10/2004 | Pitts |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,143,169 B1 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,216,170 B2 * | 5/2007 | Ludvig et al. ............ 709/225 |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 | 7/2007 | Wein et al. |
| 7,254,636 B1 | 8/2007 | O'Toole, Jr. et al. |
| 7,257,581 B1 * | 8/2007 | Steele et al. ............ 709/203 |
| 7,260,598 B1 | 8/2007 | Liskov et al. |
| 7,269,784 B1 | 9/2007 | Kasriel et al. |
| 7,289,519 B1 | 10/2007 | Liskov |
| 7,293,093 B2 | 11/2007 | Leighton |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,363,291 B1 | 4/2008 | Page |
| 7,441,045 B2 | 10/2008 | Skene et al. |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,624,169 B2 | 11/2009 | Lisiecki et al. |
| 7,650,376 B1 | 1/2010 | Blumenau |
| 7,653,700 B1 | 1/2010 | Bahl et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,716,367 B1 | 5/2010 | Leighton et al. |
| 7,725,602 B2 | 5/2010 | Liu et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,769,823 B2 | 8/2010 | Jenny et al. |
| 7,773,596 B1 | 8/2010 | Marques |
| 7,774,342 B1 | 8/2010 | Virdy |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,937,477 B1 | 5/2011 | Day et al. |
| 7,949,779 B2 | 5/2011 | Farber et al. |
| 7,962,597 B2 | 6/2011 | Richardson et al. |
| 7,966,404 B2 | 6/2011 | Hedin et al. |
| 7,979,509 B1 | 7/2011 | Malmskog et al. |
| 7,991,910 B2 | 8/2011 | Richardson et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,065,275 B2 | 11/2011 | Eriksen et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 8,321,568 B2 | 11/2012 | Sivasubramanian et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0056416 A1 | 12/2001 | Garcia-Luna-Aceves |
| 2001/0056500 A1 | 12/2001 | Farber et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0083118 A1 | 6/2002 | Sim |
| 2002/0083148 A1 | 6/2002 | Shaw et al. |
| 2002/0087374 A1 | 7/2002 | Boubez et al. |

| | | | | | |
|---|---|---|---|---|---|
| 2002/0092026 A1 | 7/2002 | Janniello et al. | 2005/0171959 A1 | 8/2005 | Deforche et al. |
| 2002/0099616 A1 | 7/2002 | Sweldens | 2005/0188073 A1 | 8/2005 | Nakamichi et al. |
| 2002/0099850 A1 | 7/2002 | Farber et al. | 2005/0192008 A1 | 9/2005 | Desai et al. |
| 2002/0101836 A1 | 8/2002 | Dorenbosch | 2005/0216569 A1 | 9/2005 | Coppola et al. |
| 2002/0107944 A1 | 8/2002 | Bai et al. | 2005/0216674 A1 | 9/2005 | Robbin et al. |
| 2002/0116481 A1 | 8/2002 | Lee | 2005/0232165 A1 | 10/2005 | Brawn et al. |
| 2002/0124098 A1 | 9/2002 | Shaw | 2005/0259672 A1 | 11/2005 | Eduri |
| 2002/0129123 A1 | 9/2002 | Johnson et al. | 2005/0262248 A1 | 11/2005 | Jennings, III et al. |
| 2002/0138286 A1 | 9/2002 | Engstrom | 2005/0267991 A1 | 12/2005 | Huitema et al. |
| 2002/0138437 A1 | 9/2002 | Lewin et al. | 2005/0267992 A1 | 12/2005 | Huitema et al. |
| 2002/0143989 A1 | 10/2002 | Huitema et al. | 2005/0267993 A1 | 12/2005 | Huitema et al. |
| 2002/0147770 A1 | 10/2002 | Tang | 2005/0278259 A1 | 12/2005 | Gunaseelan et al. |
| 2002/0156911 A1 | 10/2002 | Croman et al. | 2006/0013158 A1 | 1/2006 | Ahuja et al. |
| 2002/0161767 A1 | 10/2002 | Shapiro et al. | 2006/0020596 A1 | 1/2006 | Liu et al. |
| 2002/0163882 A1 | 11/2002 | Bornstein et al. | 2006/0020684 A1 | 1/2006 | Mukherjee et al. |
| 2002/0188722 A1 | 12/2002 | Banerjee et al. | 2006/0020715 A1 | 1/2006 | Jungck |
| 2003/0002484 A1 | 1/2003 | Freedman | 2006/0026067 A1 | 2/2006 | Nicholas et al. |
| 2003/0009591 A1 | 1/2003 | Hayball et al. | 2006/0026154 A1 | 2/2006 | Altinel et al. |
| 2003/0033283 A1 | 2/2003 | Evans et al. | 2006/0036720 A1 | 2/2006 | Faulk, Jr. |
| 2003/0037139 A1 | 2/2003 | Shteyn | 2006/0037037 A1 | 2/2006 | Miranz |
| 2003/0065739 A1 | 4/2003 | Shnier | 2006/0041614 A1 | 2/2006 | Oe |
| 2003/0074401 A1 | 4/2003 | Connell et al. | 2006/0047787 A1 | 3/2006 | Agarwal et al. |
| 2003/0099202 A1 | 5/2003 | Lear et al. | 2006/0063534 A1 | 3/2006 | Kokkonen et al. |
| 2003/0101278 A1 | 5/2003 | Garcia-Luna-Aceves et al. | 2006/0064500 A1 | 3/2006 | Roth et al. |
| 2003/0120741 A1 | 6/2003 | Wu et al. | 2006/0074750 A1 | 4/2006 | Clark et al. |
| 2003/0133554 A1 | 7/2003 | Nykanen et al. | 2006/0075084 A1 | 4/2006 | Lyon |
| 2003/0135509 A1 | 7/2003 | Davis et al. | 2006/0075139 A1 | 4/2006 | Jungck |
| 2003/0140087 A1 | 7/2003 | Lincoln et al. | 2006/0083165 A1 | 4/2006 | McLane et al. |
| 2003/0145066 A1 | 7/2003 | Okada et al. | 2006/0112176 A1 | 5/2006 | Liu et al. |
| 2003/0149581 A1 | 8/2003 | Chaudhri et al. | 2006/0120385 A1 | 6/2006 | Atchison et al. |
| 2003/0163722 A1 | 8/2003 | Anderson, IV | 2006/0143293 A1 | 6/2006 | Freedman |
| 2003/0172183 A1 | 9/2003 | Anderson, IV et al. | 2006/0155823 A1 | 7/2006 | Tran et al. |
| 2003/0174648 A1 | 9/2003 | Wang et al. | 2006/0161541 A1 | 7/2006 | Cencini |
| 2003/0182413 A1 | 9/2003 | Allen et al. | 2006/0168088 A1 | 7/2006 | Leighton et al. |
| 2003/0187935 A1 | 10/2003 | Agarwalla et al. | 2006/0190605 A1 | 8/2006 | Franz et al. |
| 2003/0187970 A1 | 10/2003 | Chase et al. | 2006/0193247 A1 | 8/2006 | Naseh et al. |
| 2003/0191822 A1 | 10/2003 | Leighton et al. | 2006/0195866 A1 | 8/2006 | Thukral |
| 2003/0200394 A1 | 10/2003 | Ashmore et al. | 2006/0227740 A1 | 10/2006 | McLaughlin et al. |
| 2003/0204602 A1 | 10/2003 | Hudson et al. | 2006/0230137 A1 | 10/2006 | Gare et al. |
| 2003/0229682 A1 | 12/2003 | Day | 2006/0233155 A1 | 10/2006 | Srivastava |
| 2003/0233423 A1 | 12/2003 | Dilley et al. | 2006/0253546 A1 | 11/2006 | Chang et al. |
| 2003/0236700 A1 | 12/2003 | Arning et al. | 2006/0253609 A1 | 11/2006 | Andreev et al. |
| 2004/0010621 A1 | 1/2004 | Afergan et al. | 2006/0259690 A1 | 11/2006 | Vittal et al. |
| 2004/0019518 A1 | 1/2004 | Abraham et al. | 2006/0259984 A1 | 11/2006 | Juneau |
| 2004/0024841 A1 | 2/2004 | Becker et al. | 2006/0265508 A1 | 11/2006 | Angel et al. |
| 2004/0030620 A1 | 2/2004 | Benjamin et al. | 2006/0265516 A1 | 11/2006 | Schilling |
| 2004/0034744 A1 | 2/2004 | Karlsson et al. | 2006/0265720 A1 | 11/2006 | Cai et al. |
| 2004/0039798 A1 | 2/2004 | Hotz et al. | 2006/0271641 A1 | 11/2006 | Stavrakos et al. |
| 2004/0044791 A1 | 3/2004 | Pouzzner | 2006/0282522 A1 | 12/2006 | Lewin et al. |
| 2004/0064501 A1 | 4/2004 | Jan et al. | 2007/0005689 A1 | 1/2007 | Leighton et al. |
| 2004/0073596 A1 | 4/2004 | Kloninger et al. | 2007/0005892 A1 | 1/2007 | Mullender et al. |
| 2004/0073867 A1 | 4/2004 | Kausik et al. | 2007/0011267 A1 | 1/2007 | Overton et al. |
| 2004/0078468 A1 | 4/2004 | Hedin et al. | 2007/0014241 A1 | 1/2007 | Banerjee et al. |
| 2004/0078487 A1 | 4/2004 | Cernohous et al. | 2007/0038994 A1 | 2/2007 | Davis et al. |
| 2004/0083307 A1 | 4/2004 | Uysal | 2007/0041393 A1 | 2/2007 | Westhead et al. |
| 2004/0117455 A1 | 6/2004 | Kaminsky et al. | 2007/0043859 A1 | 2/2007 | Ruul |
| 2004/0128344 A1 | 7/2004 | Trossen | 2007/0050522 A1 | 3/2007 | Grove et al. |
| 2004/0128346 A1 | 7/2004 | Melamed et al. | 2007/0055764 A1 | 3/2007 | Dilley et al. |
| 2004/0167981 A1 | 8/2004 | Douglas et al. | 2007/0076872 A1 | 4/2007 | Juneau |
| 2004/0172466 A1 | 9/2004 | Douglas et al. | 2007/0094361 A1 | 4/2007 | Hoynowski et al. |
| 2004/0194085 A1 | 9/2004 | Beaubien et al. | 2007/0101377 A1 | 5/2007 | Six et al. |
| 2004/0203630 A1 | 10/2004 | Wang | 2007/0118667 A1 | 5/2007 | McCarthy et al. |
| 2004/0205149 A1 | 10/2004 | Dillon et al. | 2007/0118668 A1 | 5/2007 | McCarthy et al. |
| 2004/0205162 A1 | 10/2004 | Parikh | 2007/0134641 A1 | 6/2007 | Lieu |
| 2004/0215823 A1 | 10/2004 | Kleinfelter et al. | 2007/0168517 A1 | 7/2007 | Weller et al. |
| 2004/0249971 A1 | 12/2004 | Klinker | 2007/0174426 A1 | 7/2007 | Swildens et al. |
| 2004/0249975 A1 | 12/2004 | Tuck et al. | 2007/0174442 A1 | 7/2007 | Sherman et al. |
| 2004/0267906 A1 | 12/2004 | Truty | 2007/0174490 A1 | 7/2007 | Choi et al. |
| 2004/0267907 A1 | 12/2004 | Gustafsson | 2007/0183342 A1 | 8/2007 | Wong et al. |
| 2005/0010653 A1 | 1/2005 | McCanne | 2007/0208737 A1 | 9/2007 | Li et al. |
| 2005/0021706 A1 | 1/2005 | Maggi et al. | 2007/0219795 A1 | 9/2007 | Park et al. |
| 2005/0038967 A1 | 2/2005 | Umbehocker et al. | 2007/0220010 A1 | 9/2007 | Ertugrul |
| 2005/0044270 A1 | 2/2005 | Grove et al. | 2007/0244964 A1 | 10/2007 | Challenger et al. |
| 2005/0108169 A1 | 5/2005 | Balasubramanian et al. | 2007/0250467 A1 | 10/2007 | Mesnik et al. |
| 2005/0108529 A1 | 5/2005 | Juneau | 2007/0250560 A1 | 10/2007 | Wein et al. |
| 2005/0114296 A1 | 5/2005 | Farber et al. | 2007/0253377 A1 | 11/2007 | Janneteau et al. |
| 2005/0132083 A1 | 6/2005 | Raciborski et al. | 2007/0266113 A1 | 11/2007 | Koopmans et al. |
| 2005/0157712 A1 | 7/2005 | Rangarajan et al. | 2007/0266311 A1 | 11/2007 | Westphal |
| 2005/0163168 A1 | 7/2005 | Sheth et al. | 2007/0266333 A1 | 11/2007 | Cossey et al. |

| | | |
|---|---|---|
| 2007/0271385 A1 | 11/2007 | Davis et al. |
| 2007/0280229 A1 | 12/2007 | Kenney |
| 2007/0288588 A1 | 12/2007 | Wein et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0086574 A1 | 4/2008 | Raciborski et al. |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0134043 A1 | 6/2008 | Georgis et al. |
| 2008/0147866 A1 | 6/2008 | Stolorz et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215735 A1 | 9/2008 | Farber et al. |
| 2008/0215750 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228920 A1 | 9/2008 | Souders et al. |
| 2008/0235400 A1 | 9/2008 | Slocombe et al. |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0070533 A1 | 3/2009 | Elazary et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0036944 A1 | 2/2010 | Douglis et al. |
| 2010/0070603 A1 | 3/2010 | Moss et al. |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |
| 2010/0150155 A1 | 6/2010 | Napierala |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257566 A1 | 10/2010 | Matila |
| 2010/0293479 A1 | 11/2010 | Rousso et al. |
| 2010/0299439 A1 | 11/2010 | McCarthy et al. |
| 2010/0332595 A1 | 12/2010 | Fullagar et al. |
| 2011/0040893 A1 | 2/2011 | Karaoguz et al. |
| 2011/0078000 A1 | 3/2011 | Ma et al. |
| 2011/0078230 A1 | 3/2011 | Sepulveda |
| 2011/0238501 A1 | 9/2011 | Almeida |
| 2011/0252142 A1 | 10/2011 | Richardson et al. |
| 2011/0258049 A1 | 10/2011 | Ramer et al. |
| 2011/0276623 A1 | 11/2011 | Girbal |
| 2012/0066360 A1 | 3/2012 | Ghosh |
| 2012/0179839 A1 | 7/2012 | Raciborski et al. |

OTHER PUBLICATIONS

Baglioni et al., "Preprocessing and Mining Web Log Data for Web Personalization", LNAI 2829, 2003, pp. 237-249.

International Search Report and Written Opinion in PCT/US2011/053302 mailed Nov. 28, 2011 in 11 pages.

International Search Report and Written Opinion in PCT/US2011/061486 mailed Mar. 30, 2012 in 11 pages.

Liu et al., "Combined mining of Web server logs and web contents for classifying user navigation patterns and predicting users' future requests," Data & Knowledge Engineering 61 (2007) pp. 304-330.

Singapore Examination Report in Application No. 201006837-7 mailed May 16, 2012.

Singapore Written Opinion in Application No. 201006836-9, mailed Oct. 12, 2011 in 12 pages.

Singapore Written Opinion in Application No. 201006837-7, mailed Oct. 12, 2011 in 11 pages.

Singapore Written Opinion in Application No. 201006874-0, mailed Oct. 12, 2011 in 10 pages.

Supplementary European Search Report in Application No. 09727694.3 mailed Jan. 30, 2012 in 6 pages.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Xu et al., "Decision tree regression for soft classification of remote sensing data", Remote Sensing of Environment 97 (2005) pp. 322-336.

First Office Action in Chinese Application No. 200980119993.1 dated Jul. 4, 2012.

First Office Action in Chinese Application No. 200980145872.4 dated Nov. 29, 2012.

Search Report and Written Opinion in Singapore Application No. 201103333-9 mailed Nov. 19, 2012.

First Office Action in Chinese Application No. 200980119995.0 dated Jul. 6, 2012.

Singapore Written Opinion in Application No. 201006836-9, mailed Apr. 30, 2012 in 10 pages.

* cited by examiner

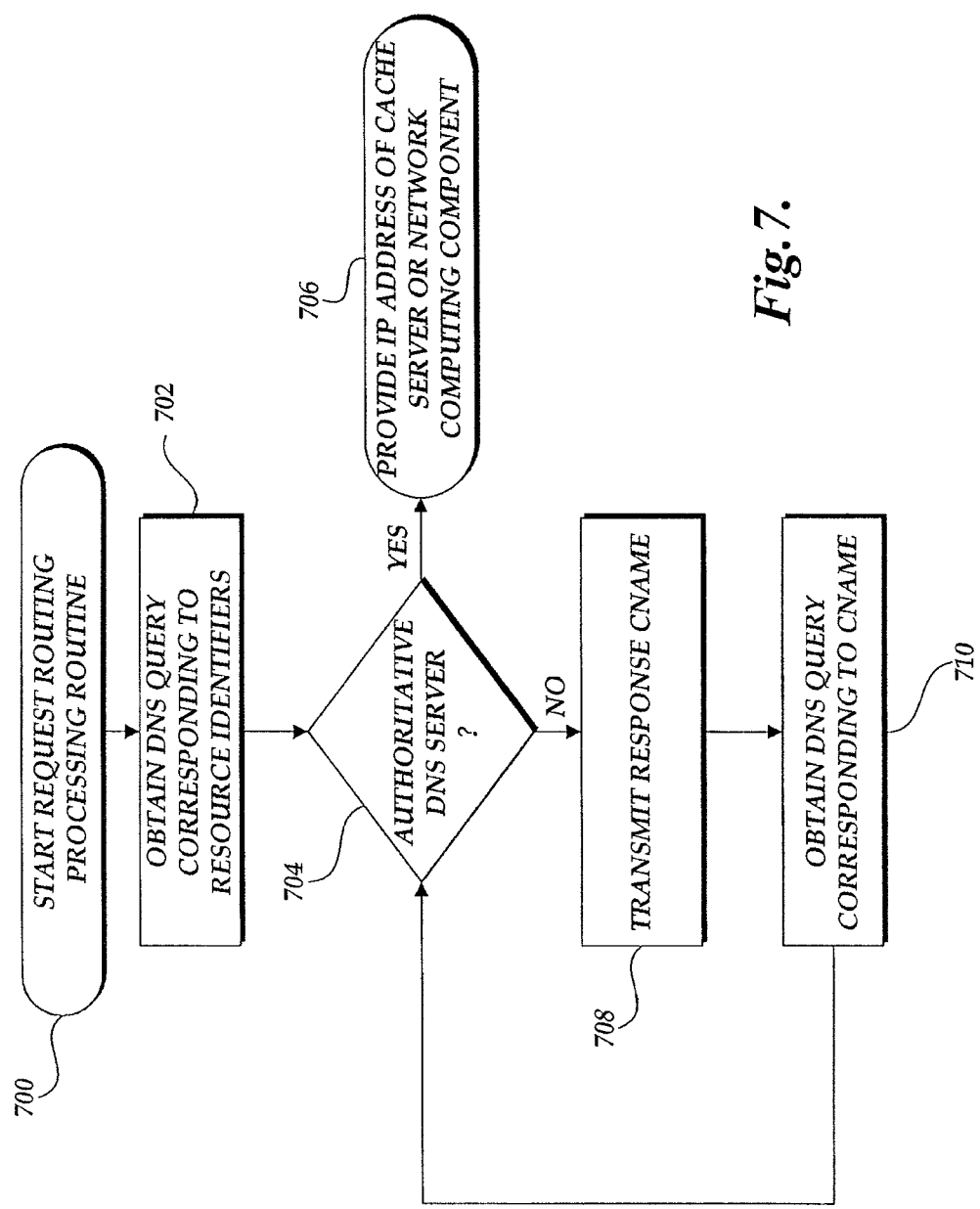

REQUEST ROUTING USING NETWORK COMPUTING COMPONENTS

CROSS REFERENCE TO RELATED APPLICATIONS

This application is a continuation of U.S. patent application Ser. No. 13/042,301, now U.S. Pat. No. 8,239,571, entitled "REQUEST ROUTING USING NETWORK COMPUTING COMPONENTS" and filed Mar. 7, 2011, which in turn is a divisional of U.S. patent application Ser. No. 12/165,343, now U.S. Pat. No. 7,925,782, entitled "REQUEST ROUTING USING NETWORK COMPUTING COMPONENTS" and filed on Jun. 30, 2008, the disclosures of which are herein incorporated by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

With reference to previous illustrative example, the content provider can leverage a CDN service provider with the modification or substitution of resource identifiers associated with the embedded resources. Specifically, the resource identifiers can reference a computing device associated with the CDN service provider such that the client computing device would transmit the request for the additional resources to the referenced CDN service provider computing device. Typically, the content provider facilitates the utilization of a CDN provider by including CDN-provider specific resources identifiers in requested content (e.g., Web pages). This approach generally corresponds to an "offline" process implemented by the content provider in advance of receipt of a request for the original content from the client computing devices. Accordingly, modifications to resource identifiers, such as to provide alternative resources identifiers for the same CDN service provider, to provide additional information utilized by CDN service providers in processing the request for content and/or to identify alternative CDN service providers, can become inefficient as they typically require implementation of the offline process the content provider.

As with content providers, CDN providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a flow diagram illustrative of a request routing routine implemented by a content delivery network service provider for selecting a cache server or network computing component.

DETAILED DESCRIPTION

Generally described, the present disclosure is directed to routing of a DNS query from a client computing device to a network computing component via a content delivery network ("CDN) for processing requested content associated with the DNS query. Specifically, aspects of the disclosure will be described with regard to the routing of a client computing device DNS query within a CDN service provider domain utilizing one or more resource identifiers which include an application identifier in a DNS portion of the resource identifier. Although various aspects of the disclosure will be described with regard to illustrative examples and embodiments, one skilled in the art will appreciate that the disclosed embodiments and examples should not be construed as limiting.

Figure 1:
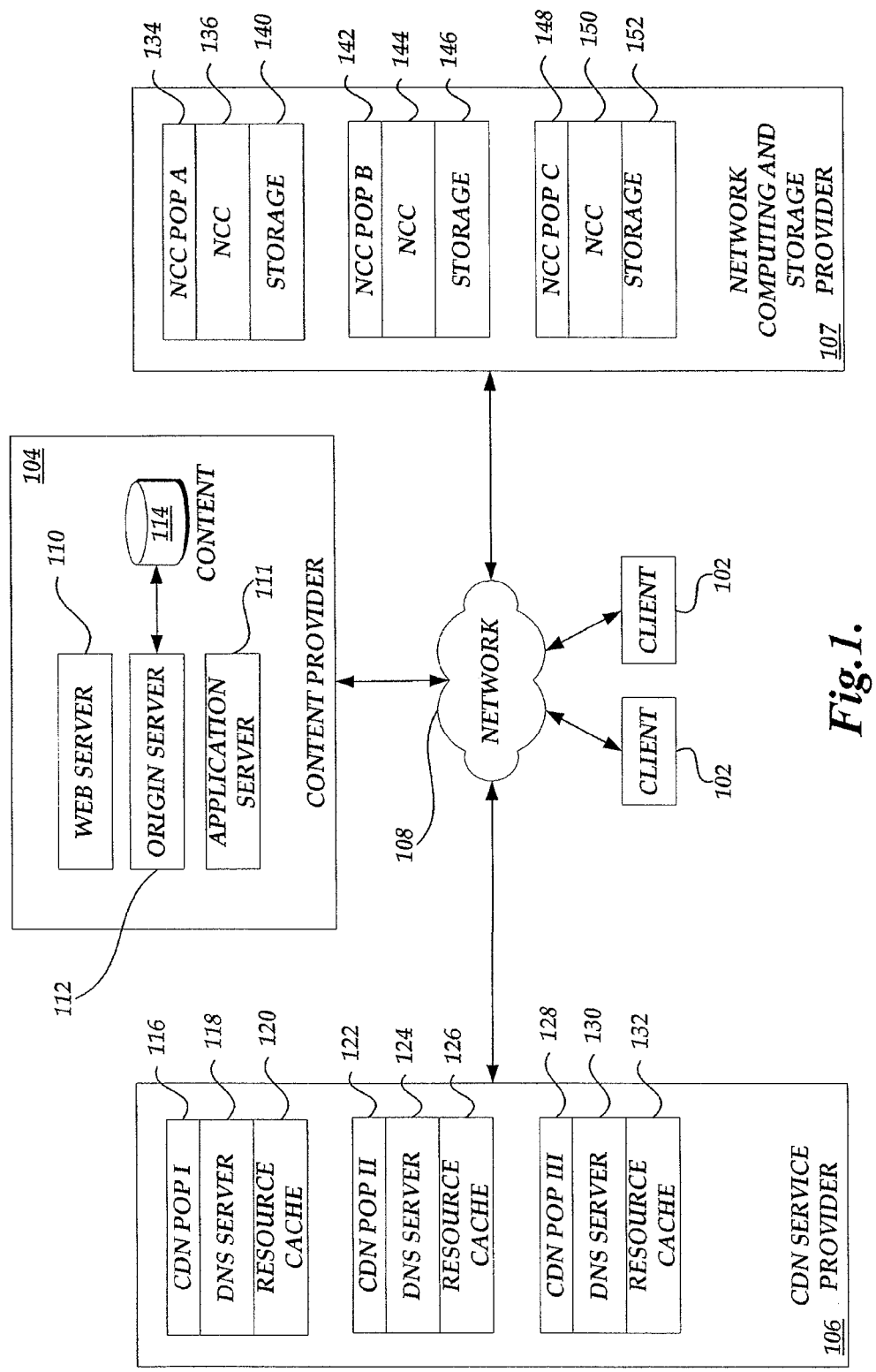
FIG. 1 is a block diagram illustrative of content delivery environment including a number of client computing devices, content provider, a content delivery network service provider, and a network computing and storage provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can corresponds to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS Name server, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content provider 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124 and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN Provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1, the content delivery environment 100 can also include a network computing and storage provider 107 in communication with the one or more client computing devices 102, the CDN service provider 106, and the content provider 104 via the communication network 108. The network computing and storage provider 107 illustrated in FIG. 1 also corresponds to a logical association of one or more computing devices associated with a network computing and storage provider. Specifically, the network computing and storage provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing resources from content providers which will be processed by an instance of an NCC 136, 144, 150 and transmitted to various client computers. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. Additionally, although the NCC POPs 134, 142, 148 are illustrated in FIG. 1 as logically associated with the network computing and storage provider 107, the NCC POPs will be geographically distributed throughout the communication network 108 in a manner to best serve various demographics of client computing devices 102. Additionally, one skilled in the relevant art will appreciate that the network computing and storage provider 107 can be associated with various additional computing resources, such additional computing devices for administration of content and resources, and the like. Even further, one skilled in the relevant art will appreciate that the components of the network computing and storage provider 107 and components of the CDN service provider 106 can be managed by the same or different entities.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
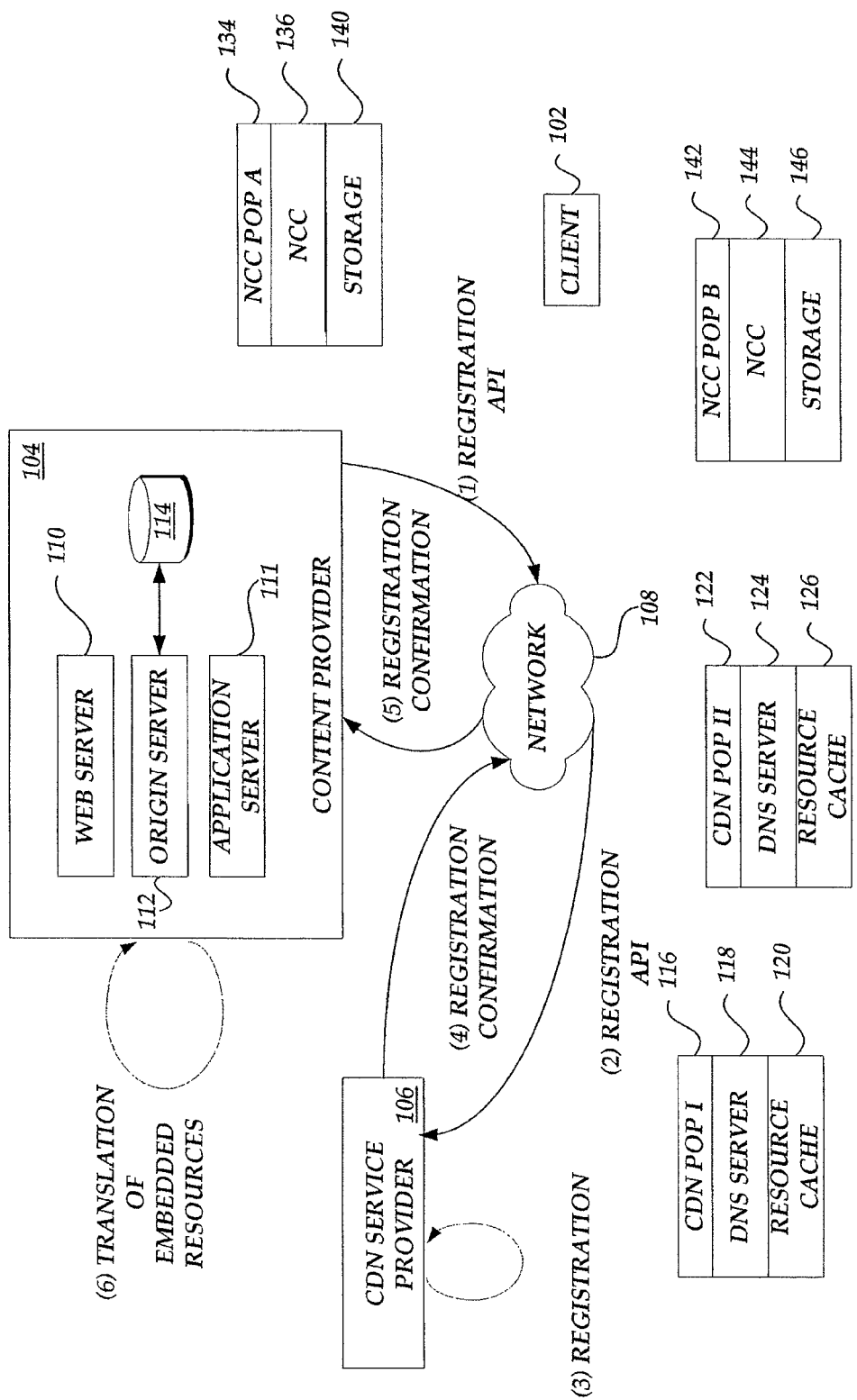
FIG. 2 is a block diagram of the content delivery environment of FIG. 1 illustrating the registration of a content provider with a content delivery service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a CDN POP 116, 122, 128 associated with the CDN service provider 106. In the event that the resource cache component 120, 126, 132 of a selected CDN POP, or the storage component 140, 146, 152 of a subsequently selected instance of an NCC 136, 144, 150 as will be described further below, does not have a copy of a resource requested by a client computing device 102, the resource cache component 120, 126, 132, or the storage component 140, 146, 152, will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, the like. In another embodiment, in addition or alternatively, the additional information can include file type identifiers and/or application identifiers which can include file type information, as well as information pertaining to a type of application for processing the requested content or a specific instance of an application desired for processing the requested content. Application identifiers may also include or be associated with other additional information or requirements for selecting an instance of an application for processing the requested content, such as quality of service criteria which can include information as to compression rates, processing power, processing speed, and/or bandwidth of the NCC, and the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translated URLs are embedded into requested content in a manner such that DNS queries for the translated URLs will resolve to a DNS server corresponding to the CDN service provider 106 and not a DNS server corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), generally referred to as a DNS portion of the URL, a name of the resource to be requested (e.g., "resource.jpg") and a path where the resource will be found (e.g., "path"), the path and resource generally referred to as a path portion of the URL. In this illustrative example, the content provider URL has the form of:

http://www.contentprovider.com/path/resource.fpg

During an illustrative translation process, the content provider URL is modified such that requests for the resources associated with the translated URLs resolve to a CDN POP associated with the CDN service provider 106. In one embodiment, the translated URL identifies the domain of the CDN service provider 106 (e.g., "cdnprovider.com"), the same name of the resource to be requested (e.g., "resource.jpg") and the same path where the resource will be found (e.g., "path"). Additionally, the translated URL can include additional processing information (e.g., "additional information") in the DNS portion of the URL. The translated URL would have the form of:

http://additional_information.cdnprovider.com/path/resource.jpg

Figure 3:
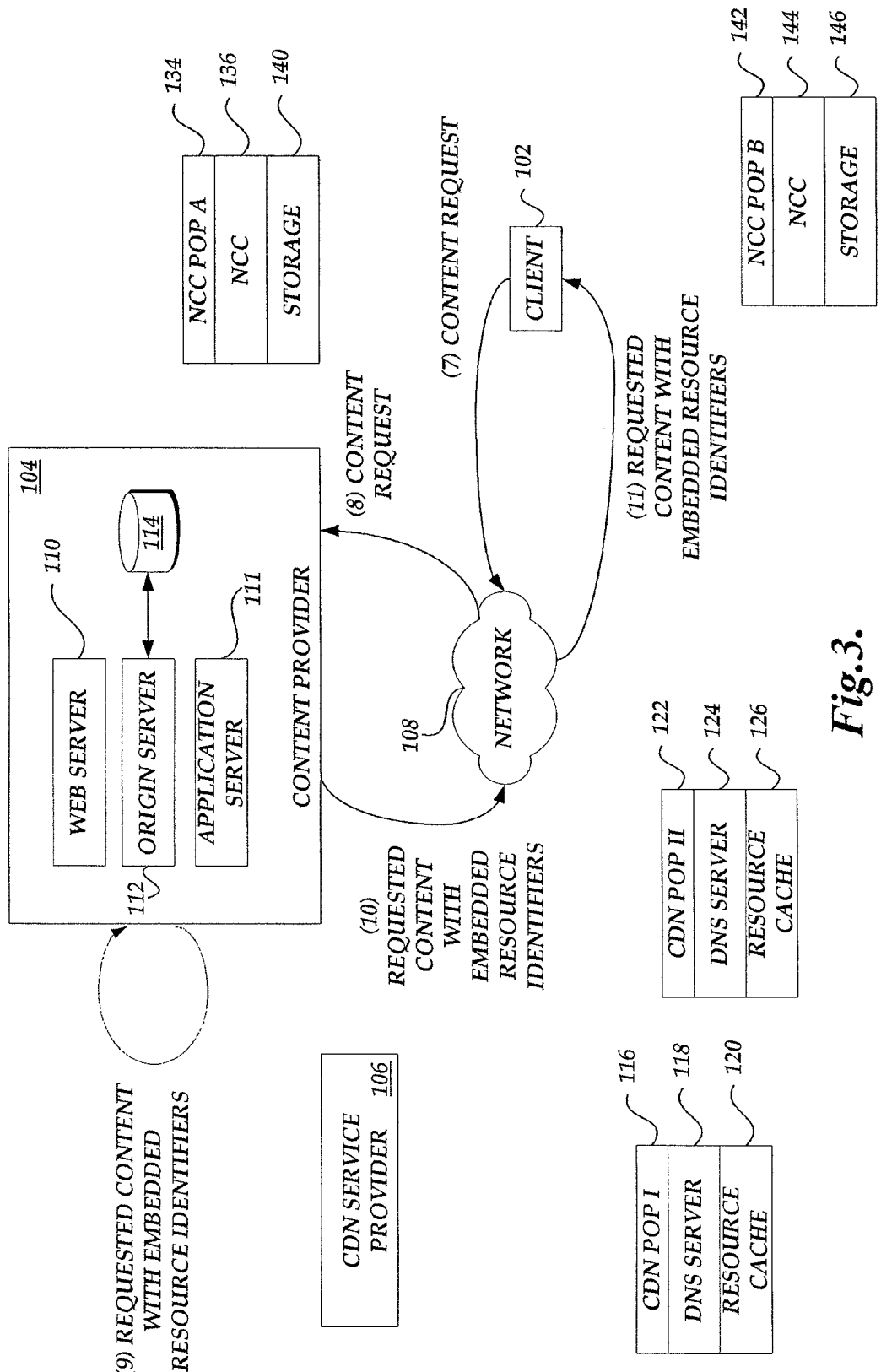
FIG. 3 is a block diagram of the content delivery environment of FIG. 1 illustrating the generation and processing of a content request from a client computing device to a content provider.

In another embodiment, the information associated with the CDN service provider 106 is included in a modified URL, such as through prepending or other techniques, such that the translated URL can maintain all of the information associated with the original URL. In this embodiment, the translated URL would have the form of:

http://additional_information.cdnprovider.com/www.contentprovider.com/path/resource.jpg With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs.

Upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), of a DNS query for the original URL resource identifier that results in the identification of a DNS server authoritative to the "." and the "com" portions of the translated URL. After resolving the "." and "corn" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

Figure 4:
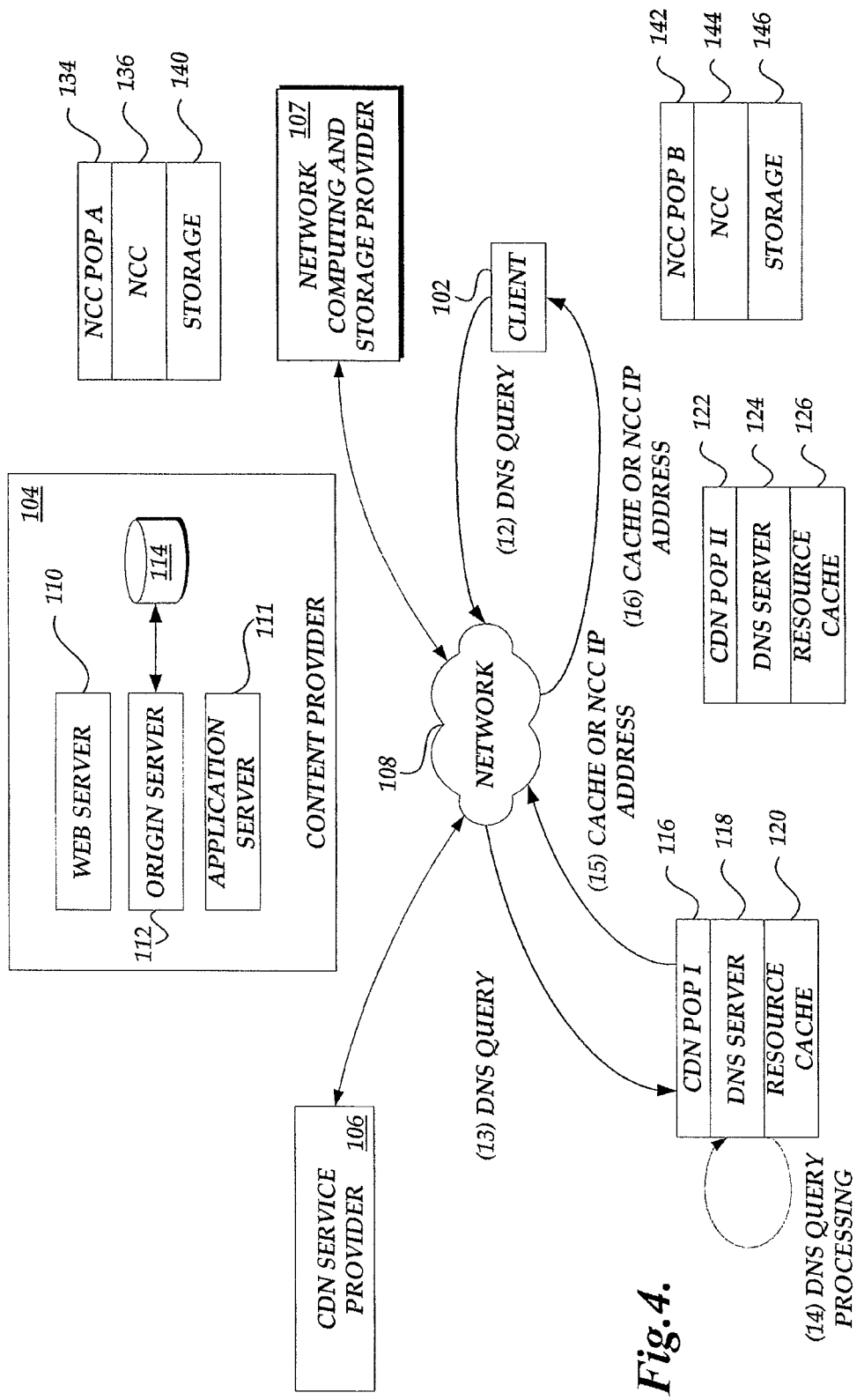
FIG. 4 is a block diagram of the content delivery environment of FIG. 1 illustrating one embodiment of the generation and processing of a DNS query corresponding to an embedded resource from a client computing device to a content delivery network service provider.

With reference now to FIG. 4, in an illustrative embodiment, the successful resolution of the "cdnprovider" portion of the original URL identifies a network address, such as an IP address, of a DNS server associated with the CDN service provider 106. In one embodiment, the IP address can be a specific network address unique to a DNS server component of a POP. In another embodiment, the IP address can be shared by one or more CDN POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP. It will be appreciated by one skilled in the relevant art that a number of ways exist to determine network topology distance.

With continued reference to FIG. 4, in either of the above identified embodiments (or any other embodiment), a specific DNS server in the DNS component 118 of a CDN POP 116 receives the DNS query corresponding to the original URL from the client computing device 102. Once one of the DNS servers in the DNS component 118 receives the request, the specific DNS server attempts to resolve the request. In one illustrative embodiment as shown in FIG. 4, a specific DNS server resolves the DNS query by identifying an IP address of a cache server component or an instance of an NCC that will process the request for the requested resource. As described above and as will be described further below in reference to FIGS. 6A and 6B, a selected resource cache component or a storage component associated with an instance of an NCC can process the request by either providing the requested resource if it is available or attempting to obtain the requested resource from another source, such as a peer cache server computing device or the origin server 112 of the content provider 104.

In further reference to FIG. 4, the specific DNS server can utilize a variety of information in selecting a resource cache component or an instance of an NCC. In one illustrative embodiment, the DNS server can use the additional information in the DNS portion of the resource identifier (which is used to resolve the DNS query by the DNS server) to return an IP address of a resource cache component or an instance of an NCC. As generally described above, the additional information can include, without limitation, client identifiers, such as client identification codes, content provider identifiers, such as content provider identification codes, executable code for processing resource identifiers, such as script-based instructions, and the like. In addition or alternatively, the additional information can include file type identifiers and/or application identifiers which can include file type information, as well as information pertaining to a type of hosted application for processing the requested content or a specific instance of a hosted application desired for processing the requested content.

As will be further described below in reference to FIG. 8, where the requested content corresponds to a streaming media file, for example, the DNS server can use an application identifier included in a DNS portion of the first resource identifier to select an instance of an NCC for processing the streaming media file. In one embodiment, the application identifier can specify file type information for the content to be processed, and the DNS server selects an instance of an NCC that has a data streaming application capable of processing a request for the identified file type, e.g., an MPEG or Flash media file. In another embodiment, the application identifier can specify a type of hosted application, e.g., an Adobe Flash server streaming application or a Real Network Helix server streaming application, to be used to process the requested content. Based on that information, the DNS server resolves the DNS query by identifying an instance of an NCC that corresponds to the identified type of application for processing the requested content or that can dynamically cause creation of such an instance. Still further, in another embodiment, the application identifier can specify a specific instance of an application, e.g., Company's Flash server, specified by a content provider for example. Based on that information, the DNS server then resolves the DNS query by identifying the IP address of a specific instance of an NCC that has the application required to process the requested content. Yet further, in another embodiment, the DNS portion of the first resource identifier can have a separate file type identifier which provides the file type information for use by the DNS server in selecting an appropriate instance of an NCC device for servicing the requested content.

Even further, the DNS server can also use information obtained directly from a client computing device (such as information provided by the client computing device or ISP) or indirectly (such as inferred through a client computing device's IP address) to select a resource cache component or an instance of an NCC. Such client computing device information can, for example, be geographic information. Still further, the DNS server components can utilize network performance metrics or measurements to assign specific resource cache components or instances of an NCC. The IP address selected by a DNS server component may correspond to a specific caching server in the resource cache or a specific instance of an NCC device. Alternatively, the IP address can correspond to a hardware/software selection component (such as a load balancer) at a specific CDN POP or NCC POP for selecting a specific cache component or instance of an NCC.

Yet still further, for selection of an instance of an NCC, the DNS server components can utilize additional selection information provided from network computing and storage provider 107 to CDN service provider 106. Such selection information can include information typically related to quality of service, such as computing capacity measurements of NCCs, compression rates, processing power, processing speed, bandwidth, and the like, which can be indirectly related to the cost associated with creating and/or using a particular instance of an NCC. This additional selection information can be provided over a communication channel between the network computing and storage provider 107 and CDN service provider 106, as generally illustrated in FIG. 4, at a variety of times. Moreover, as will be appreciated by one skilled in the relevant art, the additional selection information may be transmitted in any of a number of ways, such as upon individual requests from the CDN service provider 106, batch processing initiated by the CDN service provider or network computing and storage provider, and the like.

In further reference to FIG. 4, once an IP address is identified, the DNS server 118 provides the IP address of the resource cache component or the instance of an NCC to the client computing device 102 for further processing, as will be discussed further below in reference to FIGS. 6A and 6B.

In another illustrative embodiment, and as will be described further in reference to FIGS. 5A-5C, the additional information included in the DNS portion of the resource identifier can be used to identify a DNS server component which can then default to a selection of a resource cache component of the same CDN POP or an instance of an NCC of an associated NCC POP. The association can correspond to geographic or network proximity.

Figure 5A:
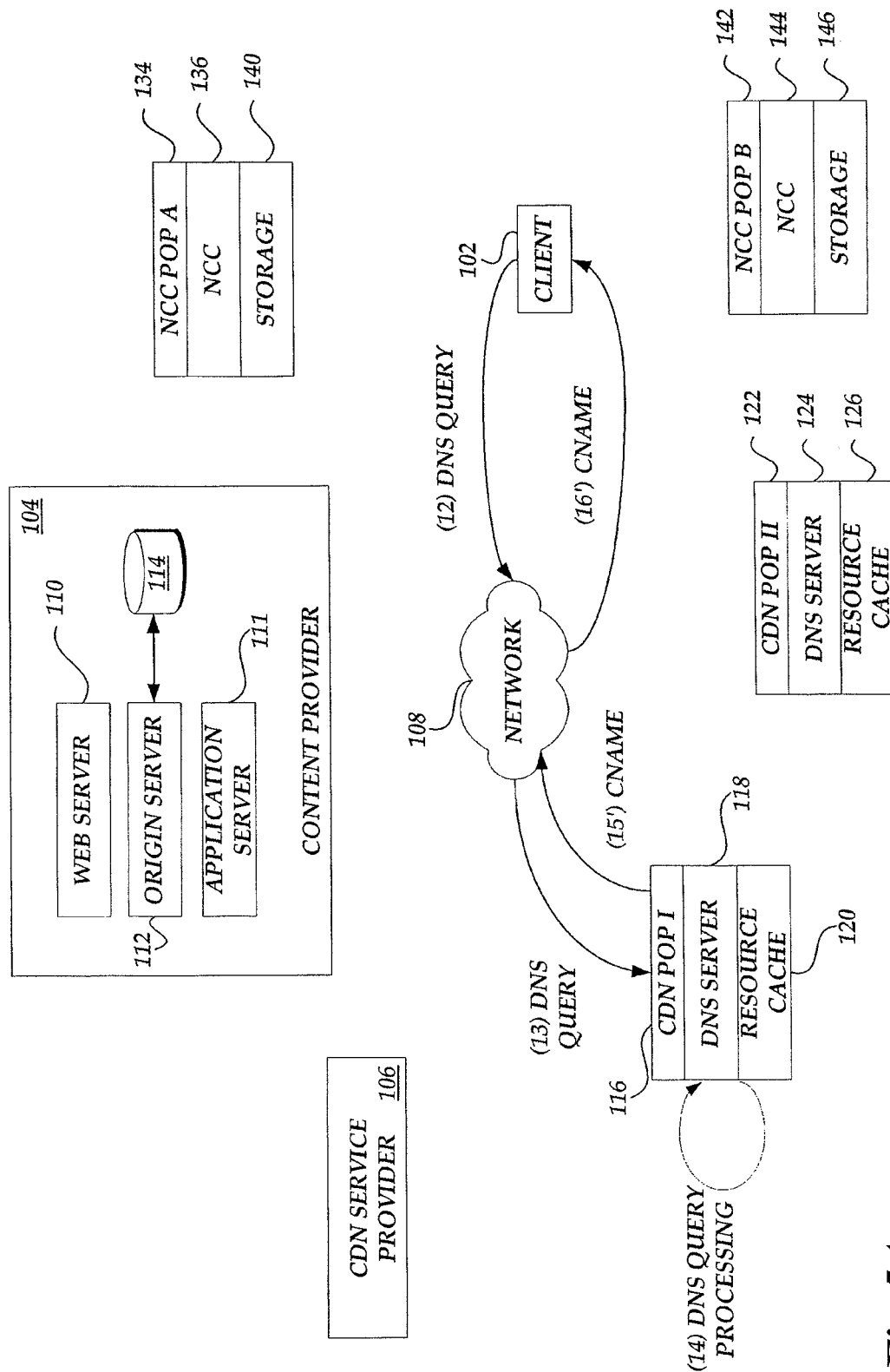
FIGS. 5A-5C are block diagrams of the content delivery environment of FIG. 1 illustrating another embodiment of the generation and processing of a DNS query corresponding to an embedded resource from a client computing device to a content delivery network service provider and the subsequent generation and processing of DNS queries corresponding to a first and a second alternative resource identifier from a client computing device to a content delivery network.
Figure 5B:
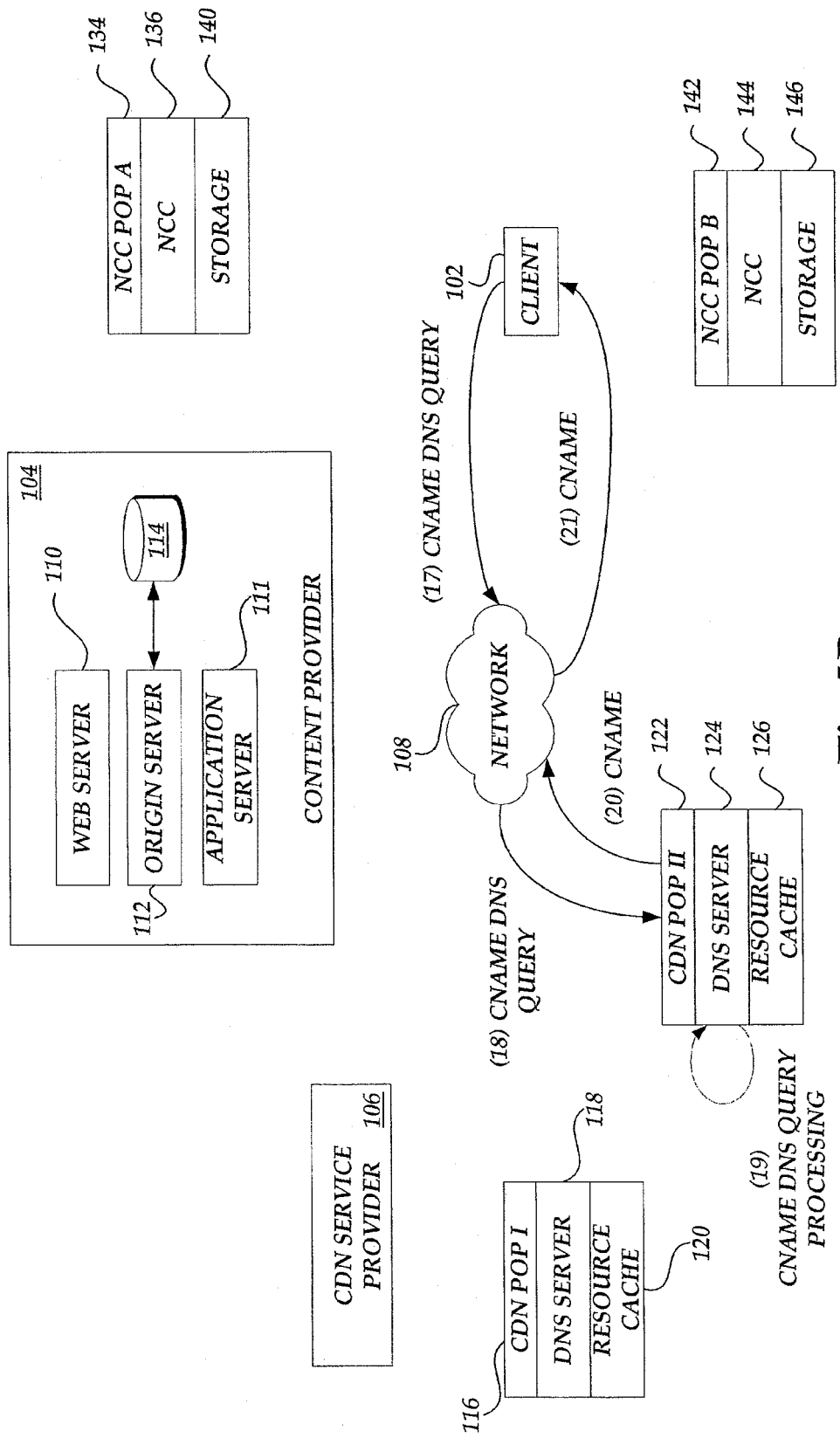
Figure 5C:
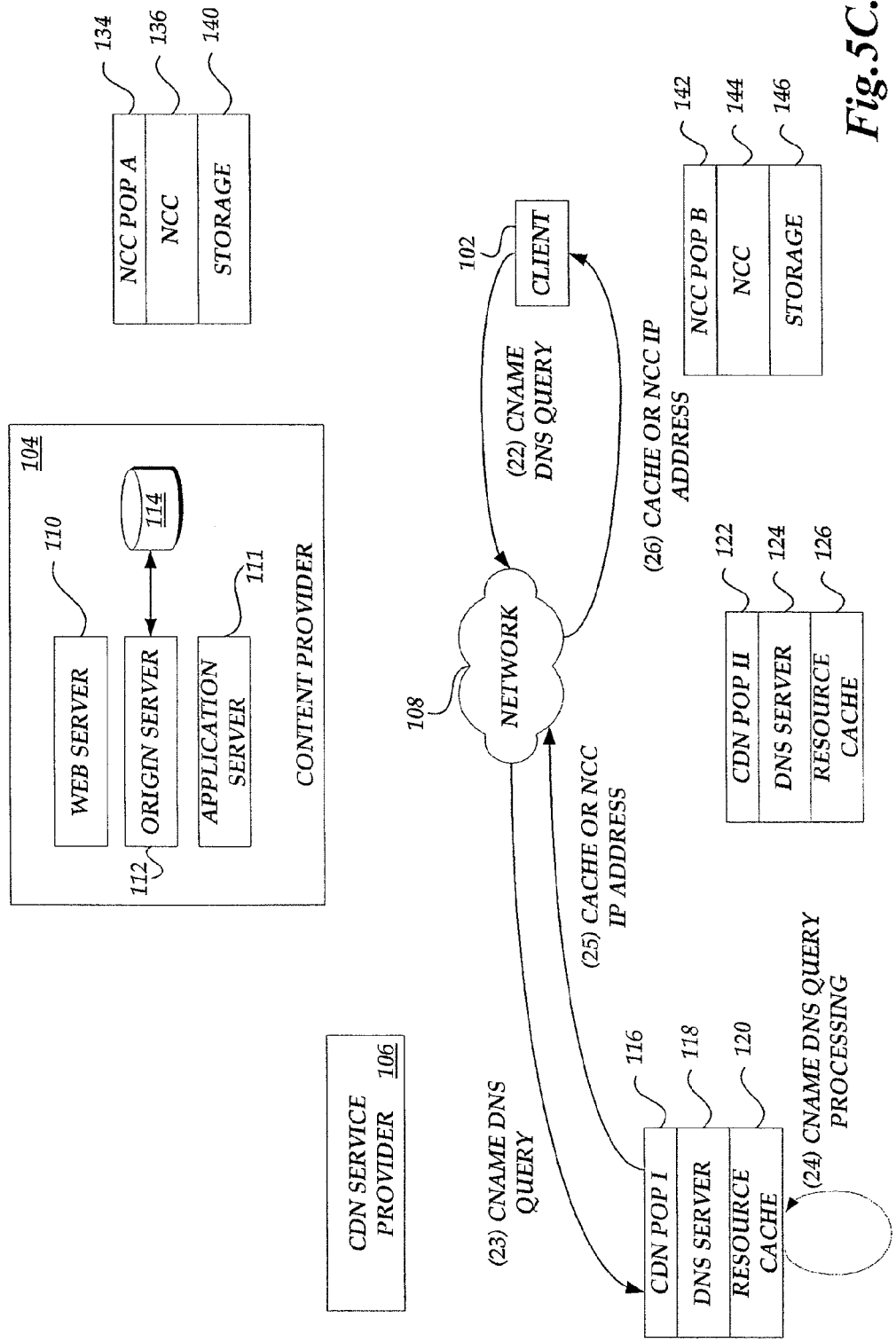

With reference to FIGS. 5A-5C, as an alternative to selecting a resource cache component or an instance of an NCC upon receipt of a DNS query as described in reference to FIG. 4, the CDN service provider 106 can maintain sets of various alternative resource identifiers which correspond to DNS server components associated with a cache component or an instance of an NCC that satisfy the criteria provided in the DNS portion of the resource identifier, e.g., in an application identifier, and that will be further selected based on additional request routing criteria. The alternative resource identifiers can be provided by the CDN service provider 106 to the client computing device 102 such that a subsequent DNS query on the alternative resource identifier will resolve to a different DNS server component within the CDN service provider's network. In an illustrative embodiment, the alternative resource identifiers are in the form of one or more canonical name ("CNAME") records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL or in a previous CNAME record. Additionally, each CNAME record includes additional information, such as request routing information, (e.g., "request routing information"). An illustrative CNAME record can have the form of:

request_routing_information.cdnprovider.com

In an illustrative embodiment, the CNAME records are generated and provided by the DNS servers to identify a more appropriate DNS server of the CDN service provider 106.

In one embodiment, if the first DNS server determines that it is the appropriate DNS server (e.g., it can resolve the DNS query by providing an IP address of a cache component or instance of an NCC), the DNS server identifies a default, associated cache component or instance of an NCC POP to resolve the request. Alternatively, even though the DNS server can resolve the request, the DNS server can determine if another DNS server can also service the request based on additional request routing criteria, which will be described in detail below.

In one example, the CDN service provider 106 can also attempt to direct a DNS query to DNS servers according to geographic criteria. The geographic criteria can correspond to geographic-based regional service plans contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS server in a region corresponding to the content provider's regional plan. In this example, the DNS server component 118 may also obtain geographic information from the client directly (such as information provided by the client computing device or ISP) or indirectly (such as inferred through a client computing device's IP address).

In another example, the CDN service provider 106 can also attempt to direct a DNS query to DNS servers according to service level criteria. The service level criteria can correspond to service or performance metrics contracted between the CDN service provider 106 and the content provider 104. Examples of performance metrics can include latencies of data transmission between the CDN service provider POPs and the client computing devices 102, total data provided on behalf of the content provider 104 by the CDN service provider POPs, error rates for data transmissions, and the like.

In still a further example, the CDN service provider 106 can attempt to direct a DNS query to DNS servers according to network performance criteria. The network performance criteria can correspond to measurements of network performance for transmitting data from the CDN service provider POPs to the client computing device 102. Examples of network performance metrics can include network data transfer latencies (measured by the client computing device or the CDN service provider 106, network data error rates, and the like.

In yet a further example, the receiving DNS server can attempt to direct a DNS query to another appropriate DNS query for load balancing or load sharing purposes. The receiving DNS may obtain an identification of other CDN POPs that define an order for such load balancing/load sharing. The list can be dynamic or periodically updated based on current network conditions.

In yet another example, the CDN service provider 106 can attempt to direct a DNS query associated with a resource request for processing by an instance of an NCC to DNS servers according to selection information criteria provided by the network computing and storage provider 107. As similarly set forth above, such selection information can include information typically related to quality of service, such as computing capacity measurements of NCCs, compression rates, processing power, processing speed, bandwidth, and the like, which can be indirectly related to the cost associated with creating and/or using a particular instance of an NCC. This selection information can be provided over a communication channel between the network computing and storage provider 107 and CDN service provider 106 at a variety of times. Moreover, as will be appreciated by one skilled in the relevant art, the selection information may be transmitted in any of a number of ways, such as upon individual requests from the CDN service provider 106, batch processing initiated by the CDN service provider or network computing and storage provider, and the like.

In accordance with an illustrative embodiment, the DNS server maintains a data store that defines CNAME records for various incoming DNS queries. If a DNS query corresponding to a particular DNS query matches an entry in the data store, the DNS server returns a CNAME record as defined in the data store. In an illustrative embodiment, the data store can include multiple CNAME records corresponding to a particular DNS query. The multiple CNAME records would define a set of potential candidates that can be returned to the client computing device. In such an embodiment, the DNS server, either directly or via a network-based service, selects one of the CNAME records defined in the data store as more appropriate routing information based on logic that factors information contained in a DNS portion of the first resource identifier, as described above. It will be appreciated by one skilled in the art and others that the DNS server can implement further additional logic in selecting an appropriate CNAME from a set of possible of CNAMEs. In an illustrative embodiment, each DNS server component 118, 124, 130 maintains the same data stores that define CNAME records, which can be managed centrally by the CDN service provider 106. Alternatively, each DNS server component 118, 124, 130 can have POP specific data stores that define CNAME records, which can be managed centrally by the CDN service provider 106 or locally at the POP 116, 122, 128. Still further, each DNS server computing device within the DNS server components 118, 124, 130 can utilize shared data stores managed by a respective POP or a local data store specific to an individual DNS server computing device.

The returned CNAME can also include request routing information that is different from or in addition to the information provided in the URL/CNAME of the current DNS query. For example, if the CNAME selection is further based on a service level plan, in addition to information associated with an application identifier included in the first resource identifier, a specific further identifier can be included in the "request_routing_information" portion of the CNAME record. An illustrative CNAME record in this specific example can have the form of:

serviceplan.appID.cdnprovider.com

In another embodiment, request routing information can be found in the identification of a CDN service provider 106 domain different from the domain found in the current URL/CNAME. For example, if the CNAME is based on a regional plan, a specific regional plan domain (e.g., "cdnprovder-region1.com") could be used in the domain name portion of the specific CNAME record. One skilled in the relevant art will appreciate that additional or alternative techniques and/or combination of techniques may be used to include the additional request routing information in the CNAME record that is selected by the DNS server component 118.

With continued reference to FIG. 5A, in accordance with the embodiments set forth above, the DNS server may select (or otherwise obtain) a CNAME record that is intended to resolve to a more appropriate DNS server of the CDN service provider 106. It may be possible, however, that the same DNS server would also be authoritative for the subsequent DNS query for the CNAME to be provided to the client computing device. For example, a specific DNS server may be authoritative for both a specific regional plan and a service level plan. Thus, returning a CNAME would still result in the DNS query arriving at the same DNS query (which may also be due in part to the client computing device's geography). In such an embodiment, the DNS server, such as DNS server component 118, may choose to resolve the future DNS query in advance.

With reference now to FIG. 5B, upon receipt of the CNAME from the DNS server component 118, the client computing device 102 generates a subsequent DNS query corresponding to the CNAME. As previously discussed with regard to FIG. 4, the DNS query process could first start with DNS queries for the "." and "com" portions, followed by a query for the "cdnprovider" portion of the CNAME. To the extent, however, that the results of a previous DNS queries can be cached (and remain valid), the client computing device 102 can utilize the cached information and does not need to repeat the entire process. However, at some point, depending on whether the CNAME provided by DNS server component 118 (FIG. 5A) and the previous URL/CNAME share common CDN service provider domains, the current CNAME DNS query resolves to a different POP provided by the CDN service provider 106. As illustrated in FIG. 5B, the DNS server component 124 of CDN POP 122 receives the current CNAME based on the different information in the current CNAME previously provided by the DNS server component 118. As previously described, the DNS server component 124 can then determine whether to resolve the DNS query on the CNAME with an IP address of a cache component or an instance of an NCC that will process the content request or whether to provide another alternative resource identifier selected in the manners described above.

For purposes of illustration, assume that the DNS server component 124 determines that the DNS query corresponding to the current CNAME (provided by DNS server component 118) also corresponds to a CNAME record in its data store. In such an example, the DNS server component 124 would do any necessary processing to select a specific CNAME as described above and return the CNAME to the client computing device. With reference now to FIG. 5C, the client computing device 102 would now transmit a second subsequent DNS query corresponding to the CNAME provided by DNS server component 124 (FIG. 5B). In accordance with DNS query processes already described, the DNS query would illustratively be received by the DNS server component 130 of CDN POP 128. Again, the DNS server component 130 can then determine whether to resolve the DNS query on the CNAME with an IP address of a cache component or an instance of a NCC that will process the content request or whether to provide another alternative resource identifier selected in the manners described above. In this example, the DNS server component 130 returns an IP address.

With continued reference to FIG. 5C, in an illustrative embodiment, the DNS server components, such as DNS server component 130, can utilize a variety of information in selecting a resource cache component or an instance of an NCC, as similarly set forth above. In one example, the DNS server component can default to a selection of a resource cache component of the same CDN POP or an instance of an NCC associated with the same CDN POP.

Figure 6A:
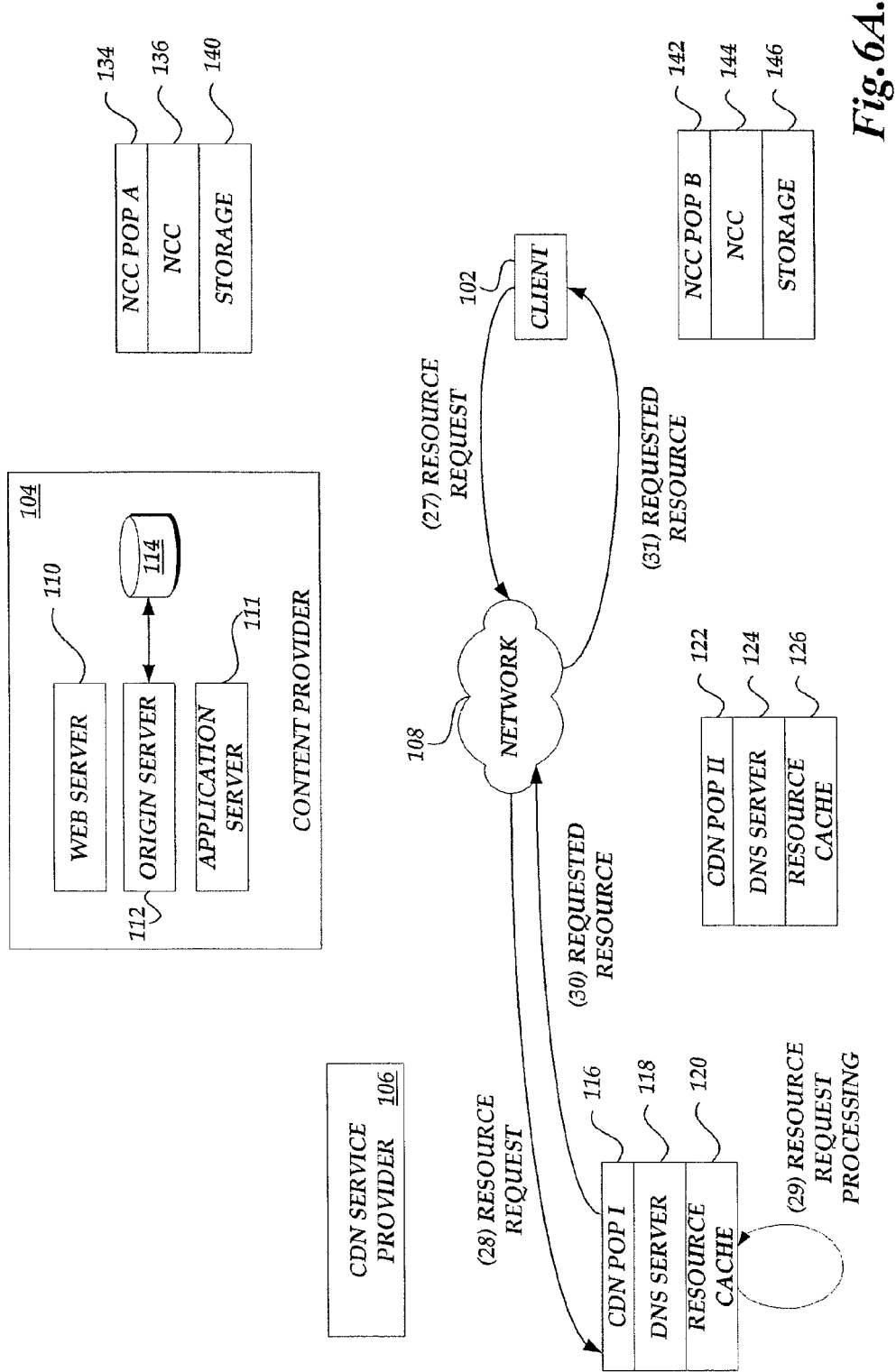
FIGS. 6A-6B are block diagrams of the content delivery environment of FIG. 1 illustrating the generation and processing of embedded resource requests from a client computing device to a content delivery network service provider.

With reference now to FIG. 6A, in an illustrative example, assume that the DNS server component 130 has selected the resource cache component 120 of POP 116. Upon receipt of the IP address for the resource cache component 120, the client computing device 102 transmits a request for the content to the resource cache component 120. The resource cache component 120 processes the request in a manner described above and the requested content is transmitted to the client computing device 102.

Figure 6B:
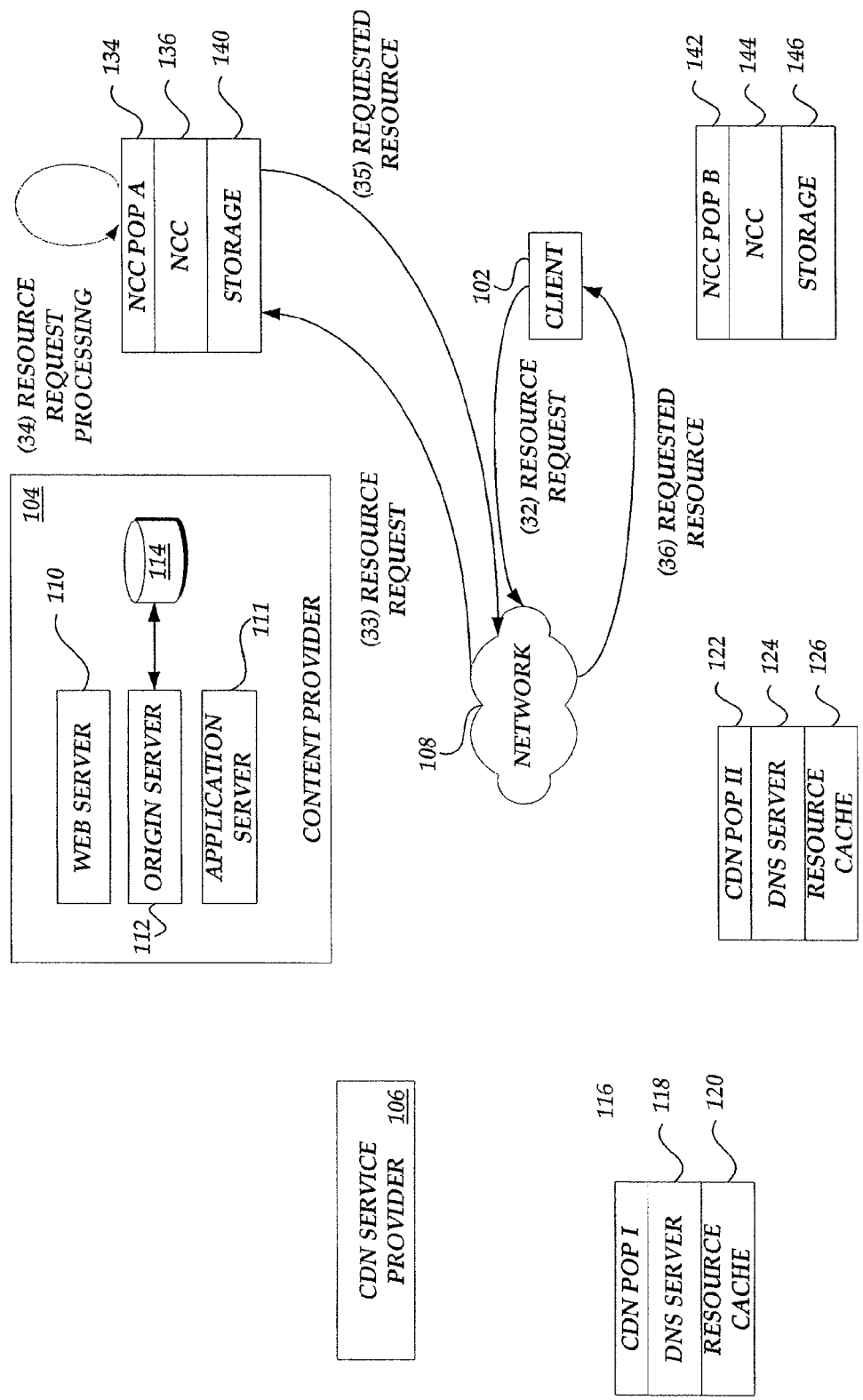

With reference now to FIG. 6B, in a further illustrative example, assume that the DNS server component 130 has selected an instance of NCC 136 of NCC POP 134. Upon receipt of the IP address for the instance of NCC 136, the client computing device 102 transmits a request for the requested content to the instance of NCC 136. The instance of NCC 136 processes the request and the requested content is transmitted to the client computing device 102. For example, for streaming media, the instance of the NCC will begin streaming the content.

With reference now to FIG. 7, a request routine 700 implemented by the CDN provider 106 will be described. One skilled in the relevant art will appreciate that actions/steps outlined for routine 700 may be implemented by one or many computing devices/components that are associated with the CDN service provider 106. Accordingly, routine 700 has been logically associated as being performed by the CDN service provider 106.

At block 702, one of the DNS server components 118, 124, 130 receives a DNS query corresponding to a resource identifier. As previously discussed, the resource identifier can be a URL that has been embedded in content requested by the client computing device 102 and previously provided by the content provider 104. Alternatively, the resource identifier can also correspond to a CNAME provided by a content provider DNS server in response to a DNS query previously received from the client computing device 102. At decision block 704, a test is conducted to determine whether the current DNS server is authoritative to resolve the DNS query. In an illustrative embodiment, the DNS server can determine whether it is authoritative to resolve the DNS query if there are no CNAME records corresponding to the received resource identifier. Additional methodologies may also be practiced to determine whether the DNS server is authoritative.

If the current DNS server is authoritative (including a determination that the same DNS server will be authoritative for subsequent DNS queries), the current DNS server resolves the DNS query by returning the IP address of a default cache server component or a default instance of an NCC. In a non-limiting manner, a number of methodologies for selecting an appropriate resource cache component or instance of an NCC have been previously discussed. Additionally, as described above, the IP address can correspond to a hardware/software selection component (such as a load balancer) at a specific CDN POP or NCC POP for selecting a specific cache component or instance of an NCC.

Alternatively, if at decision block 704 the DNS server is not authoritative, at block 808, the DNS server component selects and transmits an alternative resource identifier. As described above, the DNS server component can utilize a data store to identify an appropriate CNAME as a function of the current DNS query, including for example the application identifier in the DNS portion of the URL or CNAME. Additionally, the DNS server component can also implement additional logical processing to select from a set of potential CNAMES. At block 710, different DNS server components 118, 124, 130 receive a DNS query corresponding to the CNAME. The routine 700 then returns to decision block 704 and continues to repeat as appropriate.

Figure 8:
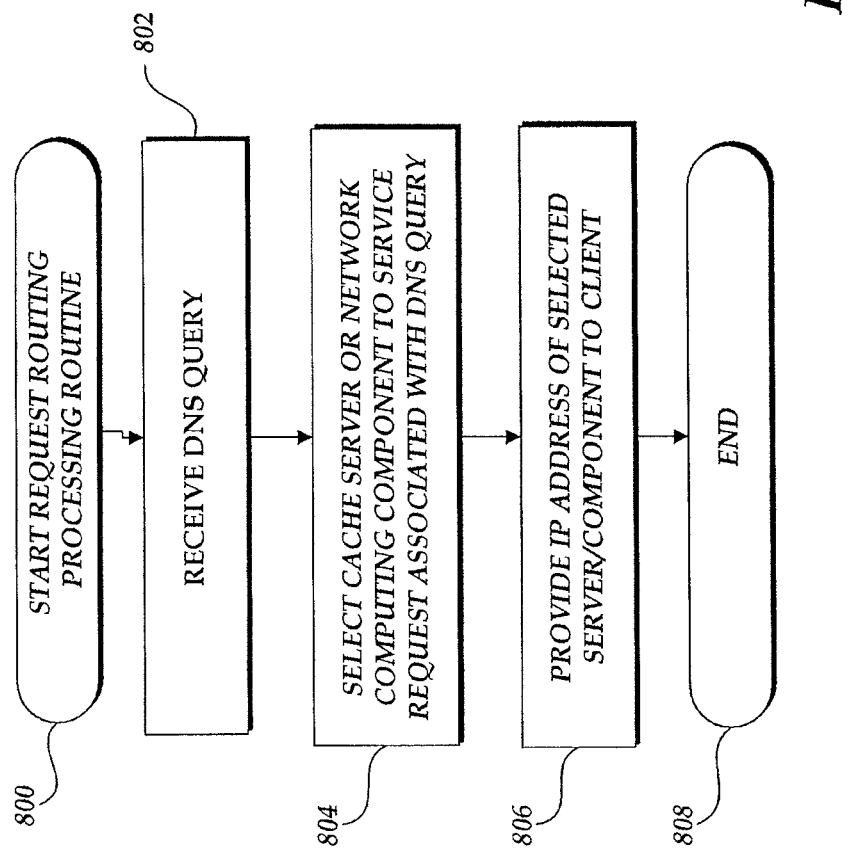
FIG. 8 is a flow diagram illustrative of another embodiment of a request routing routine implemented by a content delivery network service provider for selecting a cache server or network computing component.

With reference now to FIG. 8, a request routine 800 implemented by the CDN provider 106 will be described. One skilled in the relevant art will appreciate that actions/steps outlined for routine 800 may be implemented by one or many computing devices/components that are associated with the CDN service provider 106. Accordingly, routine 800 has been logically associated as being performed by the CDN service provider 106.

At block 802, one of the DNS server components 118, 124, 130 receives a DNS query corresponding to a resource identifier. Again, as previously discussed, the resource identifier can be a URL that has been embedded in content requested by the client computing device 102 and previously provided by the content provider 104. Alternatively, the resource identifier can also correspond to a CNAME provided by a content provider DNS server in response to a DNS query previously received from the client computing device 102. At block 804, the current DNS server selects a resource cache component or an instance of an NCC to service the request associated with the DNS query. As described above, the DNS server makes this selection as a function of a DNS portion of the resource identifier associated with the DNS query. As an example, the DNS portion of the resource identifier can specify information associated with the file type of the requested resource or an application type or specific instance of an application for processing the requested resource. As further set forth above, a number of other factors may additionally be taken into consideration for selecting the appropriate cache component or instance of an NCC for servicing the resource request.

Next, at block 806, the DNS server provides information to the client computing device identifying the selected resource cache component or instance of an NCC. In one embodiment, this information includes the IP address of the resource cache component or instance of an NCC. Thereafter, the client computing device can use that information to request and receive the requested resource. Routine 800 ends at block 806.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for request routing comprising:
   obtaining a DNS query from a client computing device at a DNS server, wherein the DNS query corresponds to a requested resource associated with a first resource identifier, wherein the first resource identifier includes a first portion with DNS information and a second portion with path information, wherein an application identifier is included in the first portion, and wherein the DNS server corresponds to a content delivery network service provider;
   parsing, at the DNS server, the application identifier from the first resource identifier;
   selecting, at the DNS server, a network computing component for processing the requested resource from a plurality of network computing components based at least in part on the parsed application identifier; and
   responsive to the DNS query, transmitting information identifying the selected network computing component from the DNS server to the client computing device.

2. The method as recited in claim 1, wherein the network computing component comprises an application for processing the requested resource.

3. The method as recited in claim 2, wherein the application is a data streaming application.

4. The method as recited in claim 1, wherein the network computing component is operable to dynamically cause the creation of an instance of a virtual machine for processing the requested resource.

5. The method as recited in claim 1, wherein the application identifier identifies a type of application for processing the requested resource.

6. The method as recited in claim 5, wherein the network computing component is selected as a function of the type of application identified by the application identifier.

7. The method as recited in claim 1, wherein the application identifier identifies an instance of an application for processing the requested resource.

8. The method as recited in claim 7, wherein the network computing component is selected as a function of the instance of the application identified by the application identifier.

9. The method as recited in claim 1, wherein the information identifying the selected network computing component is the IP address of the selected network computing component.

10. A method for request routing comprising:
    obtaining a DNS query from a client computing device at a DNS server, wherein the DNS query corresponds to a requested resource associated with a first resource identifier, wherein the first resource identifier includes a DNS portion and a path portion, wherein the DNS portion includes a file identifier, and wherein the DNS server corresponds to a content delivery network service provider;
    parsing, at the DNS server, the file identifier from the DNS portion of the first resource identifier;
    selecting a network computing component for processing the requested resource from a plurality of network computing components based at least in part on the parsed file identifier included in the DNS portion of the first resource identifier; and
    responsive to the DNS query, transmitting information identifying the selected network computing component from the DNS server to the client computing device.

11. The method as recited in claim 10, wherein the network computing component comprises an application for processing the requested resource.

12. The method as recited in claim 11, wherein the application is a data streaming application.

13. The method as recited in claim 11, wherein the network computing component is operable to dynamically cause the creation of an instance of a virtual machine for processing the requested resource.

14. The method as recited in claim 10, wherein the information identifying the selected network computing component is the IP address of the selected network computing component.

15. A system for request routing comprising:
    a first network point of presence associated with a content delivery network service provider, wherein the first network point of presence includes a DNS server that receives a DNS query from a client computing device, wherein the DNS query corresponds to a requested resource associated with a first resource identifier, wherein the first resource identifier includes a first portion with DNS information and a second portion with path information, wherein an application identifier is included in the first portion, and wherein the DNS server in the first network point of presence is operable to:

parse the application identifier from the first resource identifier;

select a network computing component for processing the requested resource from a plurality of network computing components based on the parsed application identifier; and responsive to the DNS query, transmit information identifying the selected network computing component from the DNS server to the client computing device.

16. The system as recited in claim 15, wherein the network computing component comprises an application for processing the requested resource.

17. The system as recited in claim 16, wherein the application is a data streaming application.

18. The system as recited in claim 15, wherein the first portion includes identifying information associated with a service plan provided by an original content provider and wherein the selection of the network computing component by the DNS server is further based on the the information associated with the service plan.

19. The system as recited in claim 15, wherein the application identifier identifies a type of application for processing the requested resource.

20. The system as recited in claim 19, wherein the network computing component is selected as a function of the type of application identified by the application identifier.

21. The system as recited in claim 15, wherein the application identifier identifies an instance of an application for processing the requested resource.

22. The system as recited in claim 21, wherein the network computing component is selected as a function of the instance of the application identified by the application identifier.

23. The system as recited in claim 15, wherein the information identifying the selected network computing component is the IP address of the selected network computing component.

24. A system for request routing comprising:

a first network point of presence associated with a content delivery network service provider, wherein the first network point of presence includes a DNS server operable to:

obtain a DNS query from a client computing device, wherein the DNS query corresponds to a requested resource associated with a first resource identifier, wherein the first resource identifier includes a first portion with DNS information and a second portion with path information, wherein an application identifier is included in the first portion;

determine that the first resource identifier is associated with an alternative resource identifier by:

obtaining resource routing information corresponding to the application identifier included in the first portion of the first resource identifier; and selecting an alternative resource identifier as a function of the resource routing information corresponding to the application identifier; and transmit the alternative resource identifier to the client computing device, wherein the alternative resource identifier includes information for causing a DNS query to resolve to a domain corresponding to the content delivery service provider and supplemental request routing information not included in the first resource identifier.

25. The system as recited in claim 24 further comprising:

a second DNS server associated with the content delivery network service provider, wherein the second DNS server is operable to:

obtain a subsequent DNS query from the client computing device, wherein the subsequent DNS query corresponds to the alternative resource identifier provided by the content delivery network service provider;

resolve the subsequent DNS query to identify a network computing component for processing and providing content associated with the original resource request; and transmit information identifying the identified network computing component to the client computing device.

* * * * *

UNITED STATES PATENT AND TRADEMARK OFFICE
CERTIFICATE OF CORRECTION

PATENT NO. : 8,458,250 B2
APPLICATION NO. : 13/568005
DATED : June 4, 2013
INVENTOR(S) : Swaminathan Sivasubramanian It is certified that error appears in the above-identified patent and that said Letters Patent is hereby corrected as shown below:

In the Specification

Col. 7, Line 5, delete "fpg" and insert --jpg--.

Col. 7, Line 59, delete ""corn"" and insert --"com"--.

Col. 12, Line 44, delete ""corn"" and insert --"com"--.

In the Claims

Col. 17, Line 26, in Claim 18, delete "the the" and insert --the--.

Signed and Sealed this
Twenty-sixth Day of November, 2013

Margaret A. Focarino
*Commissioner for Patents of the United States Patent and Trademark Office*